United States Patent [19]

Graham et al.

[11] Patent Number: 4,553,596

[45] Date of Patent: Nov. 19, 1985

[54] WELL COMPLETION TECHNIQUE

[75] Inventors: John W. Graham, Alvin; A. Richard Sinclair, Houston, both of Tex.

[73] Assignee: Santrol Products, Inc., Houston, Tex.

[21] Appl. No.: 518,197

[22] Filed: Jul. 28, 1983

Related U.S. Application Data

[63] Continuation-in-part of Ser. No. 437,431, Oct. 27, 1982, Pat. No. 4,518,039, which is a continuation-in-part of Ser. No. 294,813, Aug. 20, 1981, abandoned.

[51] Int. Cl.[4] .......................................... E21B 43/116
[52] U.S. Cl. .................................... 166/295; 166/297
[58] Field of Search ............... 166/280, 281, 295, 297, 166/298, 276, 278

[56] References Cited

U.S. PATENT DOCUMENTS

| | | | |
|---|---|---|---|
| 2,452,654 | 11/1948 | Hayes et al. | 166/297 X |
| 2,815,815 | 12/1957 | Hower et al. | |
| 2,823,753 | 2/1958 | Henderson et al. | |
| 2,981,334 | 4/1961 | Powell, Jr. | |
| 2,986,538 | 5/1961 | Nesbitt et al. | 166/276 |
| 3,170,517 | 2/1965 | Graham et al. | 166/297 |
| 3,393,736 | 7/1968 | Goodwin | 166/298 X |
| 3,486,560 | 12/1969 | Hutchison et al. | 166/309 X |
| 3,696,867 | 10/1972 | Waid | 166/276 |
| 3,760,880 | 9/1973 | Dollarhide | 166/276 |
| 3,780,807 | 12/1973 | Graham et al. | 166/280 X |
| 3,857,444 | 12/1974 | Copeland | 166/276 |
| 3,929,191 | 12/1975 | Graham et al. | 166/280 X |
| 4,047,569 | 9/1977 | Tagirov et al. | 166/298 X |
| 4,336,842 | 6/1982 | Graham et al. | 166/280 X |
| 4,443,347 | 4/1984 | Underdown et al. | 166/280 X |
| 4,460,045 | 7/1984 | Elson et al. | 166/309 X |

OTHER PUBLICATIONS

Foundrez Technical Bulletin 96–880.
Monsanto Technical Bulletin No. 6070C, Butvar ® and Formvar ®, Properties and Uses.

*Primary Examiner*—George A. Suchfield
*Attorney, Agent, or Firm*—Arnold, White & Durkee

[57] ABSTRACT

A method of preventing collapse of performation tunnels extending from a well bore into a subterranean formation by filling the tunnels with self-consolidating resin coated particles and curing the resin coated particles into a permeable matrix.

8 Claims, No Drawings

WELL COMPLETION TECHNIQUE

CROSS REFERENCE TO RELATED APPLICATIONS

This application is a continuation-in-part of U.S. patent application Ser. No. 437,431, filed Oct. 27, 1982, now U.S. Pat. No. 4,518,039, which in turn is a continuation-in-part of U.S. patent application Ser. No. 294,813, filed Aug. 20, 1981, abandoned.

FIELD OF INVENTION

This invention is directed to a novel well completion technique. In particular, the invention is directed to a method for preventing the collapse of perforation tunnels in well bores.

BACKGROUND OF THE INVENTION

One of the final steps in completing an oil or gas well is establishing communication between the well bore and the formation behind the casing and cement sheath. To establish this communication, perforation tunnels are formed through the casing and cement sheath and into the formation. These tunnels are formed by either bullet or jet perforators.

In many instances, the perforation tunnels formed in the formation are unstable and can collapse. The collapse of perforation tunnels severely reduces the productivity of the well. Perforation instability can result from the crushing or cracking of an otherwise well-consolidated formation during the perforation process. Perforation collapse in a weakly consolidated or unconsolidated formation is to be expected.

Other conditions that lead to perforation collapse include various well treatments. One of the most damaging situations is caused by a matrix acidization performed through the perforations. Often the HF content of a mud acid will weaken the intragranular bond to the extent that the matrix becomes unconsolidated. In Berea sandstone for example, one hundred pore volumes of 10/3 mud acid is sufficient to render the rock unconsolidated. This process leads to the collapse of the perforation tunnels and severely reduces the well's productive capacity.

SUMMARY OF THE INVENTION

The present invention is directed to a well completion method that forms stable perforation tunnels not subject to collapse. The method comprises placing a suspension of self-consolidating particles in the well bore in the interval to be perforated. A perforating gun is positioned at the desired location in the well bore. A differential pressure is provided between the well bore and the formation so that when the perforations are formed, the suspension of self-consolidating particles will immediately flow into the perforation tunnels before they can collapse. After the perforating gun has been fired forming the perforations, the self-consolidating particles are forced into the perforation tunnels completely filling the tunnels. The resin coated particles are then cured to form a consolidated permeable matrix. This matrix supports the walls of the tunnels and prevents their collapse.

DETAILED DESCRIPTION

Materials

The self-consolidating resin coated particles are suspended in a fluid which is placed in the well bore in the interval to be perforated. The suspended fluid can be oil base, water base, an emulsion, or foam. The fluid should be sufficiently viscous so that the fall rates of the particles is low or zero.

If oil is chosen as the suspending fluid, additives such as polyisobutylene or calcium stearate can be used to impart high viscosity or gellation.

High viscosity can be imparted to water base fluids by using various synthetic and natural polymers. Included among these are hydroxy ethylcellulose. Carboxy methyl hydroxy ethylcellulose, guar gum, and polyacrylamide.

If an emulsion is chosen as the suspending fluid, the viscosity and suspending power can be altered by adjusting the various emulsion parameters including emulsion type, surfactant type and concentration, and oil to water ratio. Likewise the property of foams can be altered by varying the type and concentration of surfactant used to form the foam.

The self-consolidating particles which can be used in the instant invention are comprised of a particle substrate coated with a reactive resin. Typical examples of common particle substrates include sand, bauxite and glass beads. Resins which may be used include thermal setting phenolic resins of the resole type, phenolic novalac resins and epoxy resins. When resins such as the phenolic novalacs or epoxies are used it is required that a catalyst and/or cross-linker be provided to effect the curing of the resin.

Examples of the manufacture and use of such materials in the treatment of wells are shown in U.S. Pat. No. 3,857,444 to Copeland and U.S. Pat. No. 3,929,191 to Graham et al., both of which are hereby incorporated by reference.

Description of Preferred Self-Consolidating Particles

The preferred self-consolidating proppant is that disclosed in applicants' co-pending application Ser. No. 437,431. A description of this preferred material follows.

The preferred self-consolidating resin coated particles may utilize any suitable high strength substrate as the particle centers. Choice of the particle substrate is governed by the properties required of the cured mass.

Conventional frac sand is the preferred particle substrate of the invention. Silica sand of about 6 to about 200 mesh (U.S. Standard Sieve) is generally used. Other materials such as glass beads, sintered bauxite and other mineral particles can be used.

The resins suitable for use in forming the coating include true thermosetting phenolic resins of the resole type and phenolic novolac resins which may be rendered heat reactive through the addition of catalysts and/or hardeners. The resins must form a solid non-tacky coating at ambient temperatures. This is required so that the coated particles remain free flowing and so that they do not agglomerate under normal storage conditions. Resins with softening points of 185°–240° F. (Ball and Ring Method) are acceptable.

Regardless of which type of resin is employed a coupling agent as subsequently described is preferably incorporated into the resin during its manufacture. The coupling agent, which has a functional group reactive in the phenol-formaldehyde system of the resin is added in an amount ranging from about 0.1 to 10 percent by weight of the resin. The preferred range is from about 0.1 to 3.0 percent by weight of the resin. The coupling agent is incorporated into the resin under the normal reaction conditions used for the formation of phenol-formaldehyde resins. The coupling agent is added to the resin reactants prior to the beginning of the phenol-formaldehyde reaction. This incorporation of the coupling agent in the resin is partly responsible for the increased resin-center bond strength provided by the invention.

The preferred resin to be used to manufacture the preferred self-consolidating particles of the present invention is a phenolic novolac resin. When such a resin is used it is necessary to add to the mixture a cross-linking agent to effect the subsequent curing of the resin. Hexamethylenetetramine is the preferred material for this function as it serves as both a catalyst and a source of formaldehyde.

It is also advantageous to add an organic acid salt such as calcium stearate to the resin-center mixture to act as a lubricant. Such an addition imparts a degree of water repellency to the finished product and aids in preventing sintering of the product during storage. The organic acid salt may be added to the resin or more conveniently may be simply added as a powder at the time the resin is added to the heated centers.

Problems associated with sintering of the product during storage can be further minimized by increasing the "stickpoint" of the resin. Raising of the stickpoint avoids problems of sintering and lumping of the resin coated particle when stored at high temperatures (100° F.-120° F.).

Stickpoint is measured by applying the resin coated particles to a square metal rod heated at one end. The rod has a uniform temperature gradation from its heated end to its unheated end. After one minute the particles are dusted from the rod. The temperature of the point along the rod at which the particles adhere to the rod is measured and is the stickpoint.

To increase the stickpoint a small amount of dry hexamethylenetetramine is added to the flake novolac resin before it is coated on the centers. The blending of the hexamethylenetetramine with the resin during the initial phase of the hot coating process allows for some polymerization of the resin to occur before cooling. This polymerization results in an increase in the resin stickpoint.

The amount of hexamethylenetetramine added in this manner is dependent upon the final stickpoint desired. Generally about 1 to about 10% dry hexamethylenetetramine based on the weight of the flake resin is added. For example the addition of 2.8% hexamethylenetetramine to the resin in the manner just described elevated the stickpoint of the finished product from 210° F. to 238° F. This increase in stickpoint is sufficient to remedy the storage problems of sintering and lumping.

Another problem encountered in the use of these self-consolidating particles is the creation of dust during handling operations in the field. The resin coating on the particles is brittle and abrasive action between the particles during high velocity transport generates fine particles of free resin. This dust is objectionable to observe and its elimination is desirable.

The incorporation of a small amount of polyvinyl acetal resin into the resin coating has been found to increase the resin strength and thereby reduce its brittleness. This results in the virtual elimination of the dusting problem.

The preferred polyvinyl acetal for this application is polyvinyl butyral although other resins such as polyvinyl formals may be used.

Specifically a polyvinyl butyral, BUTVAR B-76, manufactured by Monsanto Co. has proven to be effective in strengthening the resin coating and eliminating the dust problem.

The coupling agent to be employed is chosen based on the resin to be used. For phenolic resins, the preferred coupling agents are organo functional silanes such as aminoalkylsilanes. Gamma-aminopropyltriethoxysilane has given excellent results when used with phenolic resins. Preferably the coupling agent is both incorporated into the resin structure and reacted with the center surface prior to the resin coating step. This unique dual treatment with the coupling agent results in a higher resin-center bond strength and the concomitant increase in the strength of the cured mass. The same coupling agent may be used in the resin and the center treatment or two different coupling agents may be employed. It is also possible to obtain some improvement in the strength of the cured mass by pretreating only the center surfaces or by only adding the coupling agent to the resin.

The centers to be coated are weighed and then transferred to a heated rotating drum. During the transfer, the centers are sprayed with a solution containing the coupling agent. A solution is used to insure adequate wetting of the center surface with the coupling agent. The preferred solvent is alcohol, although, certain hazards exist. Water is also an excellent treating solvent.

A sufficient quantity of water must be used to insure adequate dispersion of the coupling agent over the surface of the centers. It is also important not to use too much water as excessive time and heat are then needed to drive off the water during the evaporation step. The amount needed is of course dependent upon the size of the centers. For example for 20/40 mesh sand, it has been found that 0.5 to 5 gallon per 1000 lb of sand gives adequate coverage.

The concentration of coupling agent in the water depends on the surface area of the centers, the amount of water to be used and the nature of the coupling agent. The concentration is generally between 0.1% and 10.0% by volume. The preferred range is generally between 0.5% and 3.0%.

After the coupling agent sprayed centers have entered the heater drum, the mixture is agitated without heat for a period of time ranging from 5 seconds to 1 minute to insure proper dispersion of the coupling agent over the surface of the centers.

The heater is then fired and the centers are heated by a hot air blast to approximately 250°-350° F. During this heating period the water is evaporated and the coupling agent reacted with the surface of the centers. In addition, the hot air blast can be utilized to remove fines from the centers which can lower the permeability of the cured particle mass.

The heated centers are then discharged into a mixer. The flake resin into which a coupling agent has been incorporated is then added. The ratio of resin to the centers varies with the strength required and the size of the centers. Typically the resin coating constitutes between about 1 and about 8 percent by weight of the particles. Dry hexamethylenetetramine may also be added at this time to elevate the stickpoint as previously described.

A lubricant such as calcium stearate is added to the centers with the resin. The amount of lubricant is generally in the range of 0.1 to 10 percent based on the weight of the resin. The preferred amount is in the range of about 0.5 to 5.0 percent. Also a polyvinyl acetal may be added at this time to improve the resin strength and eliminate the creation of dust during handling.

The mixture of heated centers and resin is then agitated for a period of about 30 seconds to 5 minutes. This time must be sufficient to insure complete coverage of the centers.

An aqueous solution of hexamethylenetetramine is then added to the resin-center mixture. This solution serves as a vehicle for the addition of the hexamethylenetetramine and as a quench. The amount of hexamethylenetetramine is generally between about 10 and 20 percent based on the weight of the resin. The preferred range is between about 13 and about 17 percent. The amount of water should be sufficient to cool the mixture sufficiently to prevent reaction of the hexamethylenetetramine and to harden the resin. The amount of water needed ranges generally from about 1 to 5 gallons per 1000 lb of particles. It is of course understood that if a resole type resin is used no hexamethylenetetramine is needed. In such a case the quench is still necessary to prevent further reaction of the resin and to begin the hardening process.

After the quench solution is added, the agitation of the mixture is continued and the coated particles are further cooled by blowing air through them.

The hardened particles are then discharged to conveyors which carry the coated particles to screening and bagging operations.

The concentration of resin coated particles in the completion fluid should be in the range of about 0.1 to about 10 lbs per gallon. The preferred concentration is in the range of about 1 to about 3 lbs per gallon.

Well Completion Techniques

Initial Completion of a Well

Prior to perforating, a suspension of resin coated particles is placed in the interval to be perforated. The perforating gun is positioned within this interval and, with differential pressure into the formation, the gun is fired. Immediately following penetration of the casing, cement sheath and formation by the jet charges or bullets, the suspension of resin coated particles surges into the perforation tunnels and a tightly compacted matrix of self-consolidating resin coated particles is formed in each tunnel before tunnel collapse can occur. Ambient formation temperature will then heat the resin coated particles causing the resin to fuse and unite at contact areas between contiguous particles. As the temperature increases, the polymerization reaction proceeds until the resin is cured into an insoluble and infusible cross-link state. The pendular regions between adjacent particles bond the packed particles into a packed permeable matrix having considerable compressive strength. In the case of shallow wells, it may be necessary to provide heat to the formation to generate the necessary temperatures required to melt the resin and initiate the polymerization reaction. This can be accomplished by filling the well bore with a heated fluid after placement of the self-consolidating particles. If the resin coated particles require a catalyst to complete the curing reaction, the catalyst can be placed in the completion fluid along with the self-consolidating particles. The consolidated inner tunnel matrices thus formed support the perforation tunnels preventing their collapse. As the particle matrix permeability is much greater than the formation permeability, well productivity is not restricted.

Treatment of Previously Completed Well

The perforation tunnels already existing in a well can be packed with the permeable reinforcing matrix of the resin coated particles at any time during the life of the well. For example, the well bore can be cleaned out, the perforations washed and the suspension of resin coated particles squeezed into those perforations which will accept the suspension.

If a matrix acidization is to be performed, a suspension of acid resistant resin coated particles can be injected immediately ahead of the acid so that the perforation tunnels will be packed and reinforced prior to the entry of the acid. In this way, if the matrix surrounding the tunnels is weakened or rendered unconsolidated by the acidization process, collapse of the tunnels is prevented and well productivity maintained.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicant's intent is that all such modifications, alterations and variations which fall within the spirit and scope of the appended claims be embraced thereby.

What is claimed:

1. A method of forming supported perforation tunnels extending from a well bore into a subterranean formation comprising:
   placing a suspension of self-consolidating resin coated particles in a completion fluid in the well bore in the interval to be perforated;
   positioning a means for forming said perforations in the interval to be perforated;
   providing a differential pressure between the well bore and the formation whereby the pressure in said well bore is higher than the pressure in said formation;
   firing said perforating means so as to form perforation tunnels extending from said well bore into said formation;
   causing said suspension to flow into said perforation tunnel by means of said pressure differential so as to form a packed matrix of self-consolidating resin coated particles in said perforation tunnels; and
   curing said resin coated particles into a consolidated permeable matrix capable of supporting said perforation tunnels.

2. The method of claim 1 wherein said resin coated particles comprise:
   high strength centers;
   a coupling agent chemically bound to said centers;
   a novolac resin coated over said centers and chemically bound to said coupling agent; and
   a cross-linking agent.

3. The method of claim 1 wherein the concentration of said resin coated particles in the completion fluid is in the range of about 0.1 to about 10 lbs per gallon.

4. The method of claim 3 wherein the concentration of said particles in the completion fluid is in the range of about 1 to about 3 lbs per gallon.

5. The method of claim 1 wherein said completion fluid is water based.

6. The method of claim 1 wherein said completion fluid is oil based.

7. The method of claim 1 wherein said completion fluid is an emulsion.

8. The method of claim 1 wherein said completion fluid is a foam.

* * * * *